May 22, 1956 J. P. WALKER ET AL 2,747,002
WELL FLUID SEPARATORS AND METHODS FOR SEPARATING WELL FLUIDS
Filed Oct. 24, 1952 9 Sheets-Sheet 2
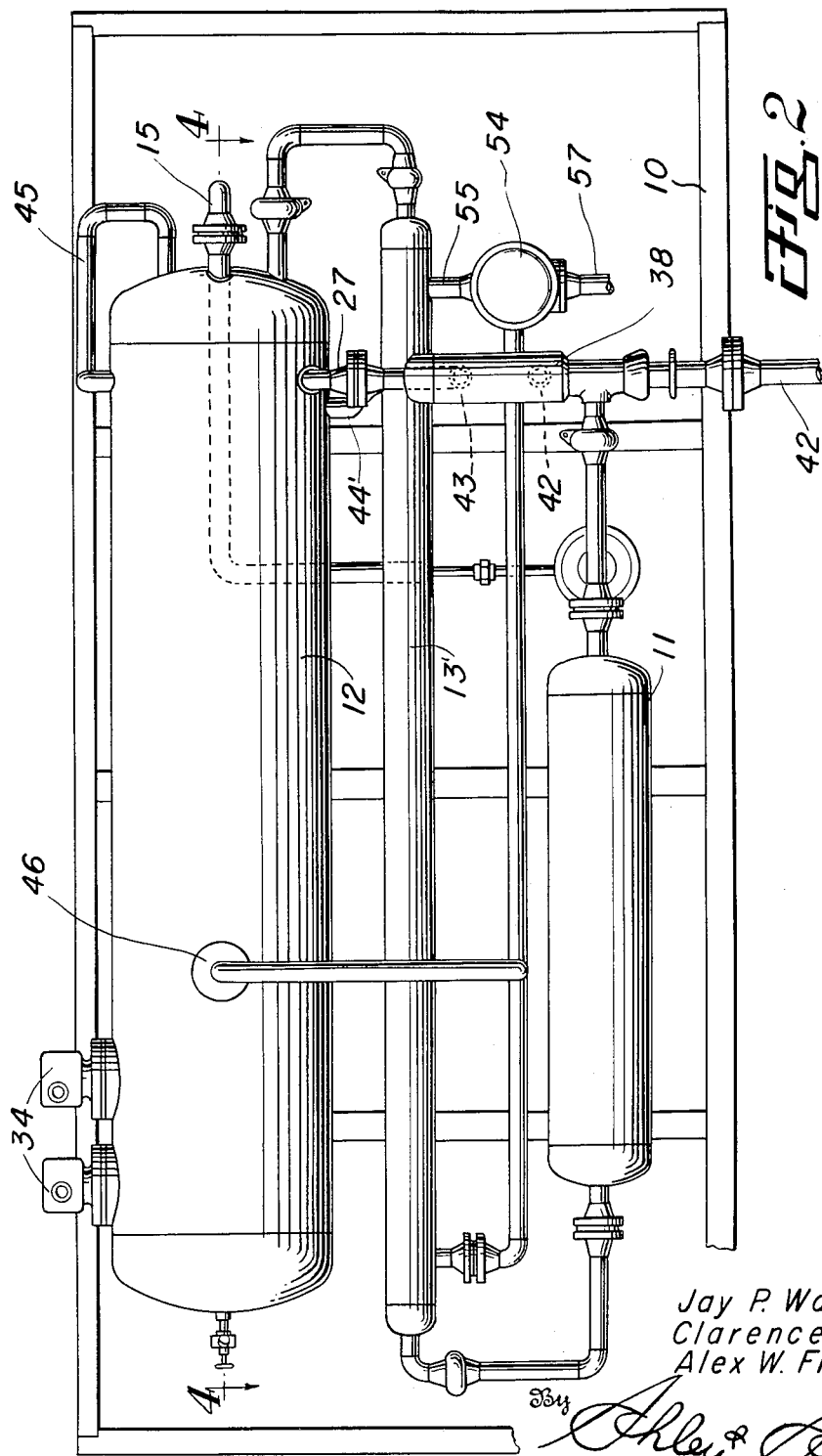
Inventors
Jay P. Walker
Clarence O. Glasgow
Alex W. Francis, Jr.
By Ashley & Ashley
ATTORNEYS

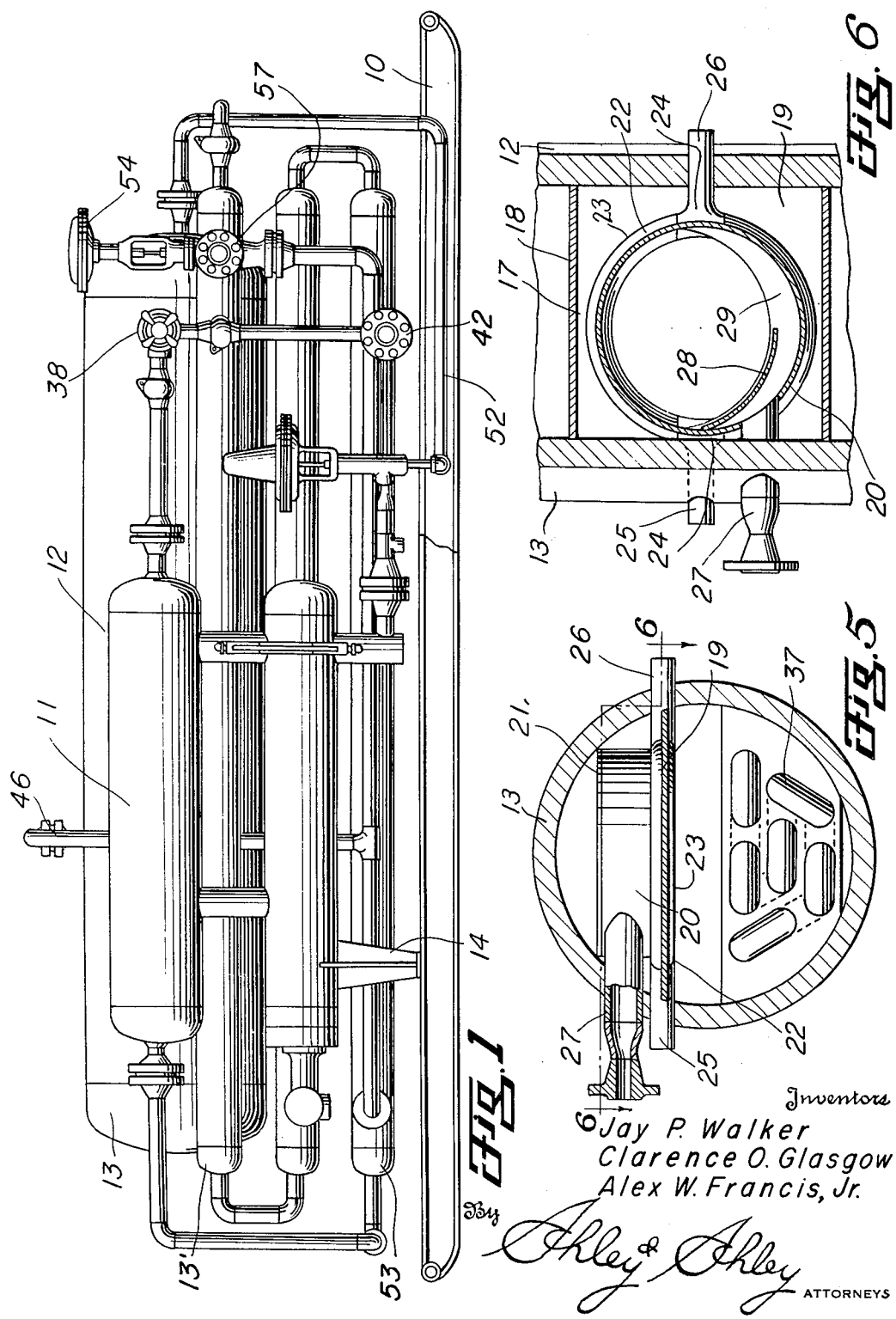

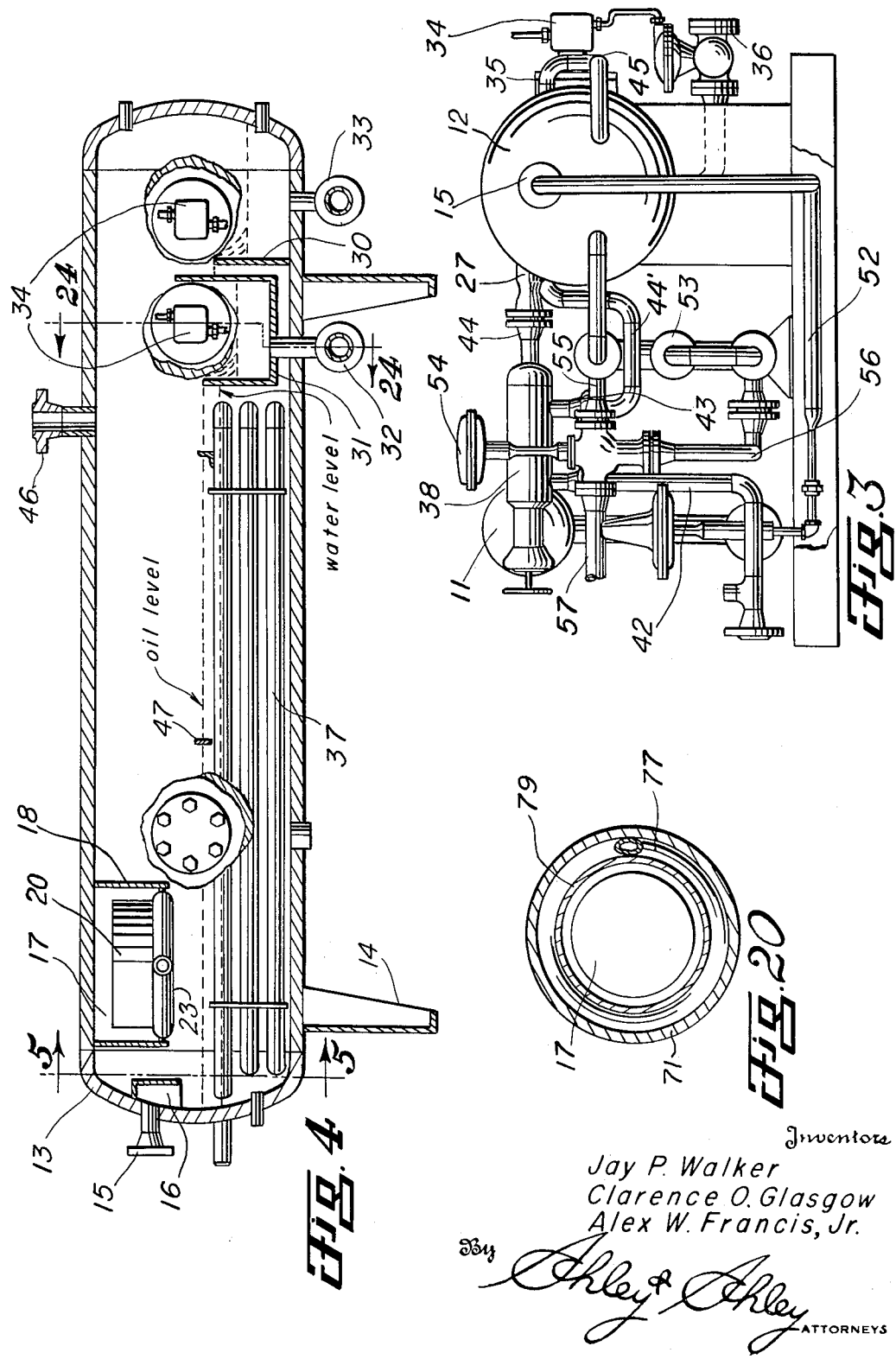

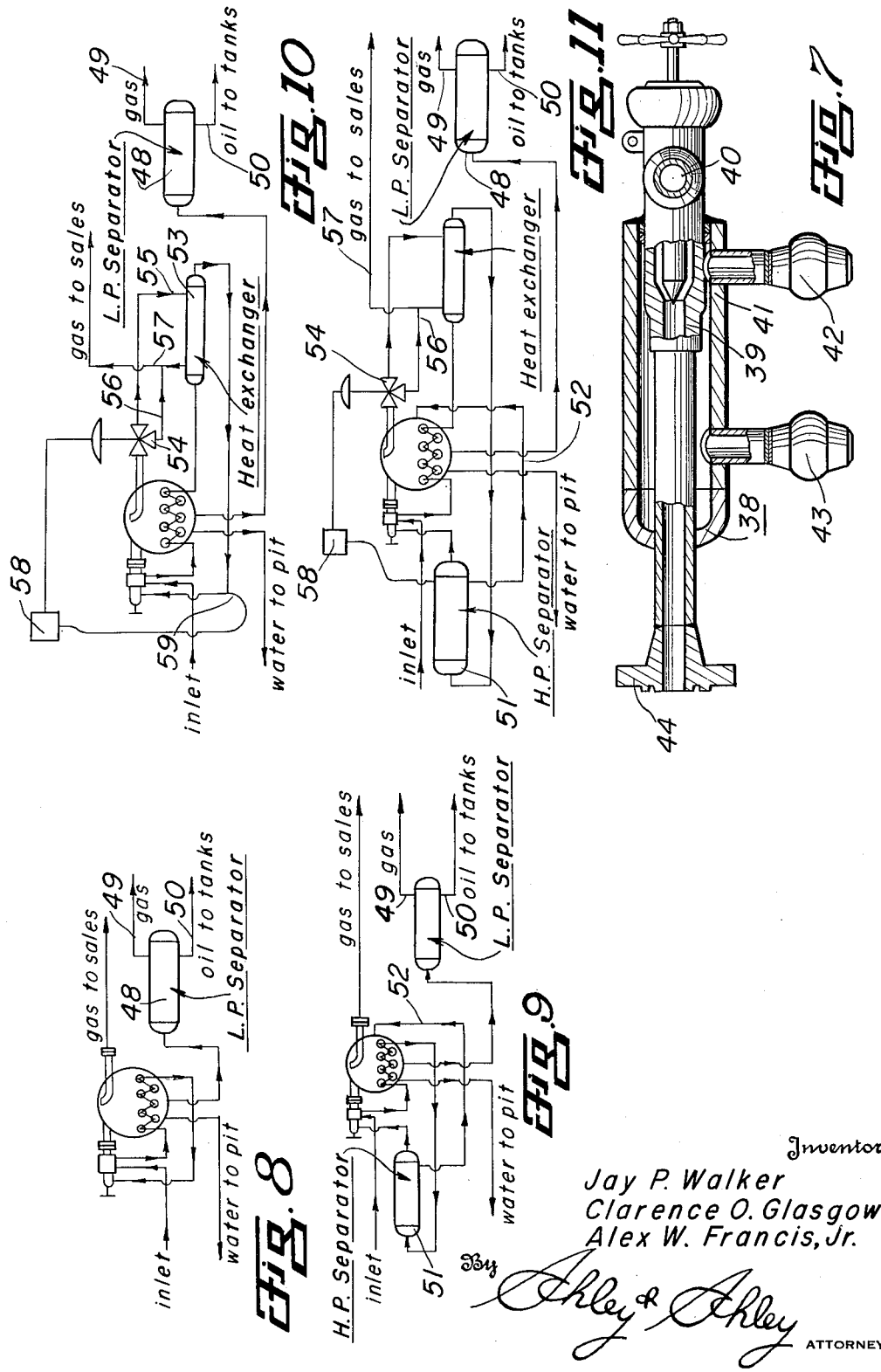

May 22, 1956  J. P. WALKER ET AL  2,747,002
WELL FLUID SEPARATORS AND METHODS FOR SEPARATING WELL FLUIDS
Filed Oct. 24, 1952  9 Sheets-Sheet 5

Inventors
Jay P. Walker
Clarence O. Glasgow
Alex W. Francis, Jr.

By Ahley & Ahley
ATTORNEYS

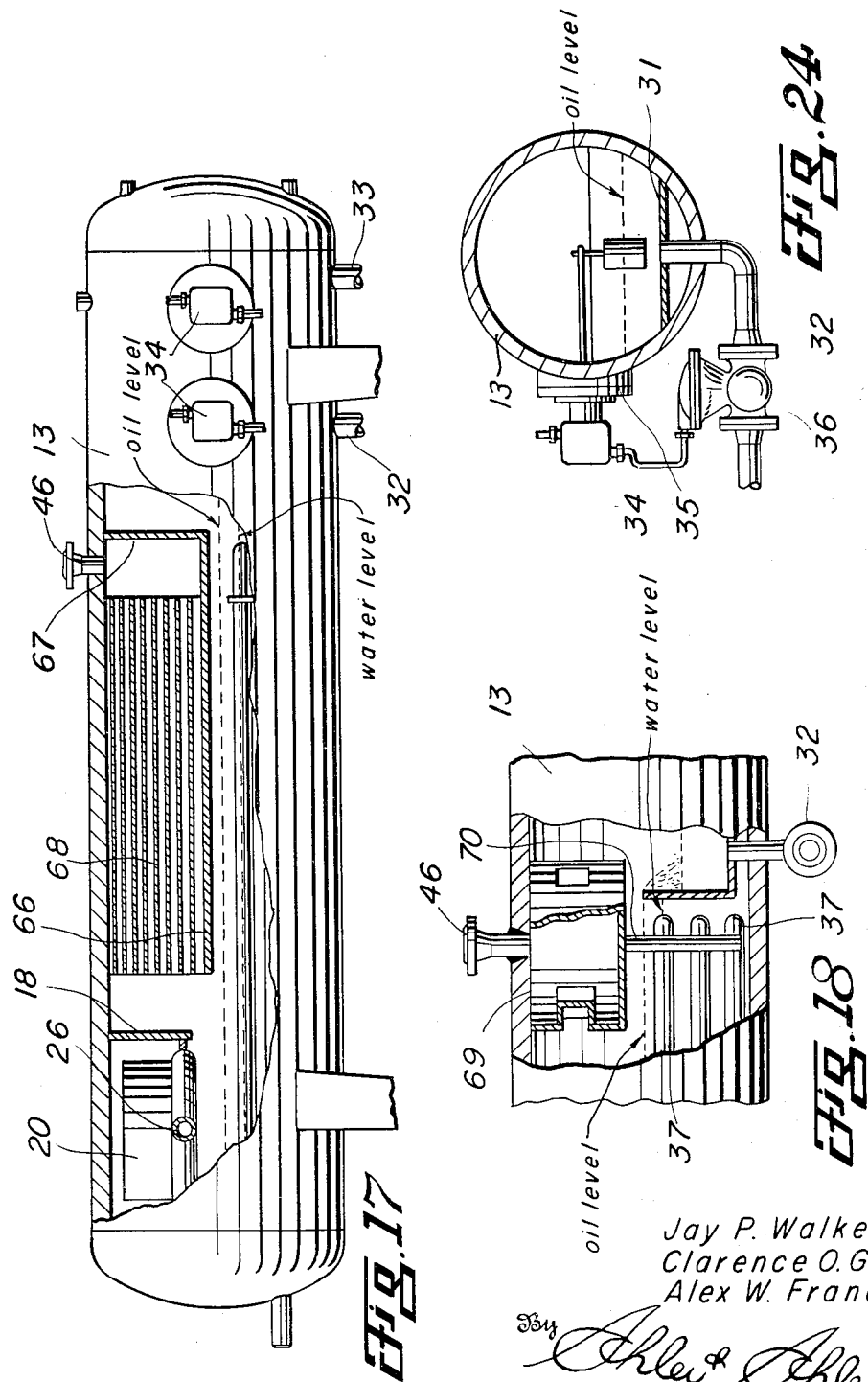

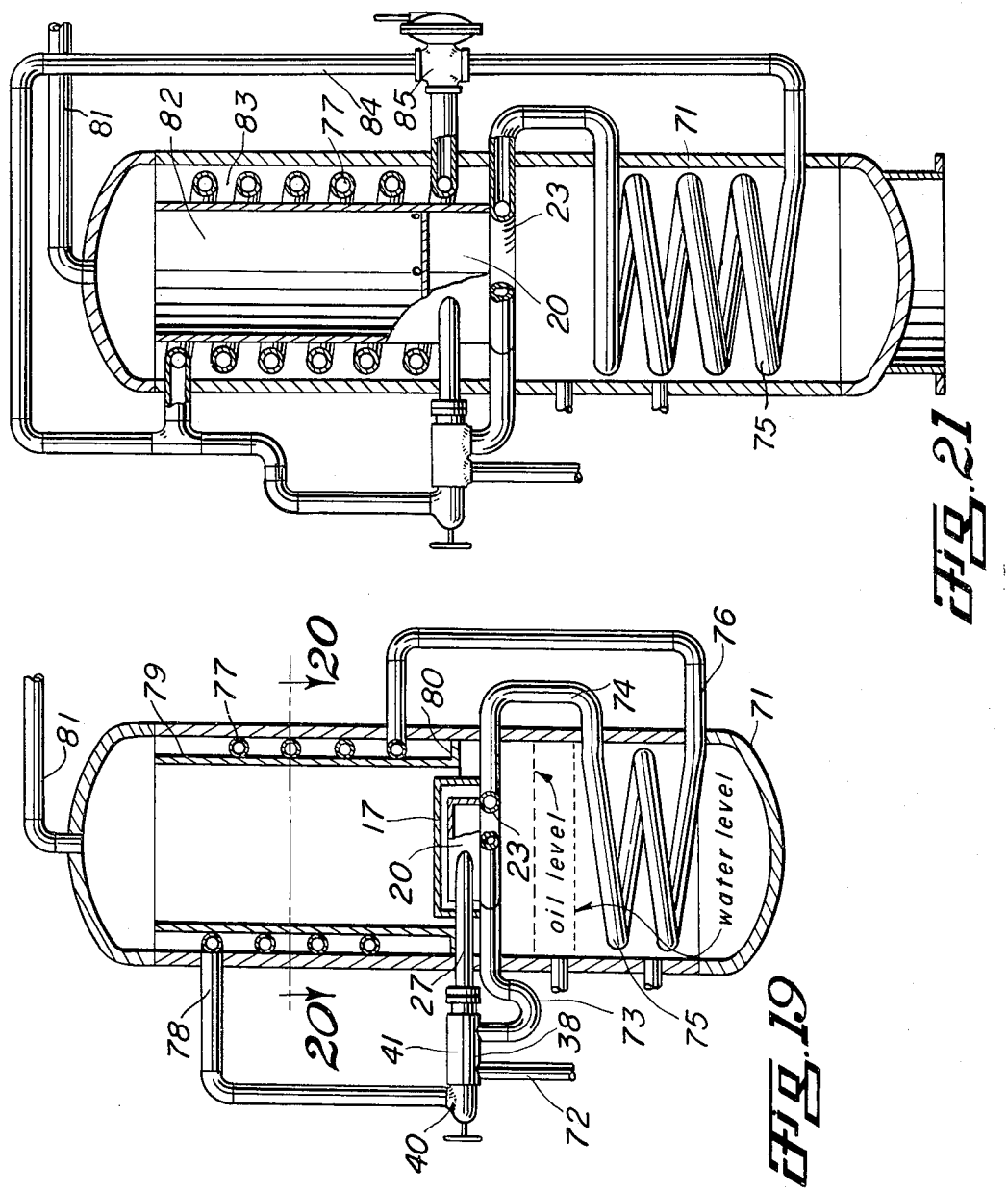

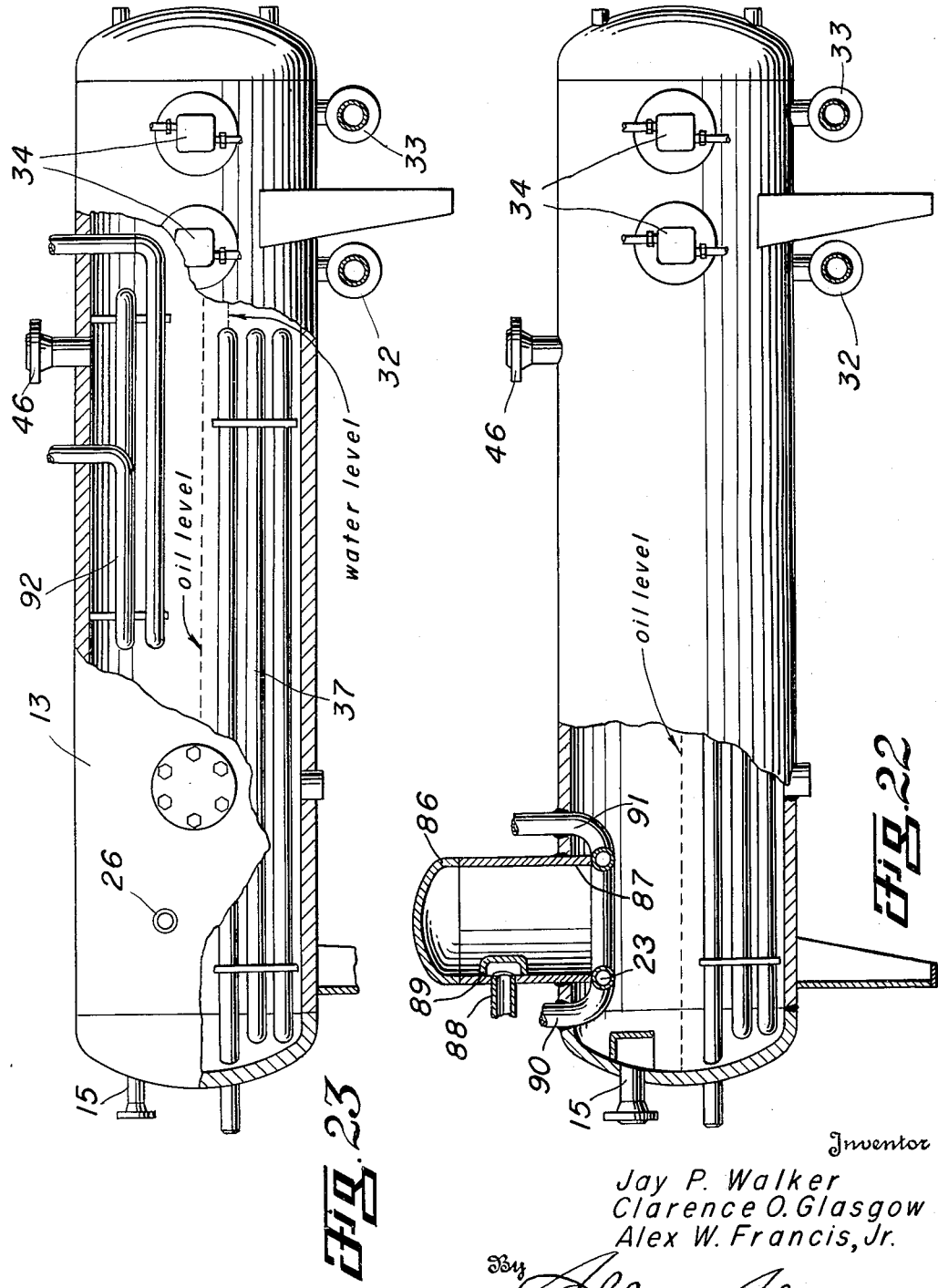

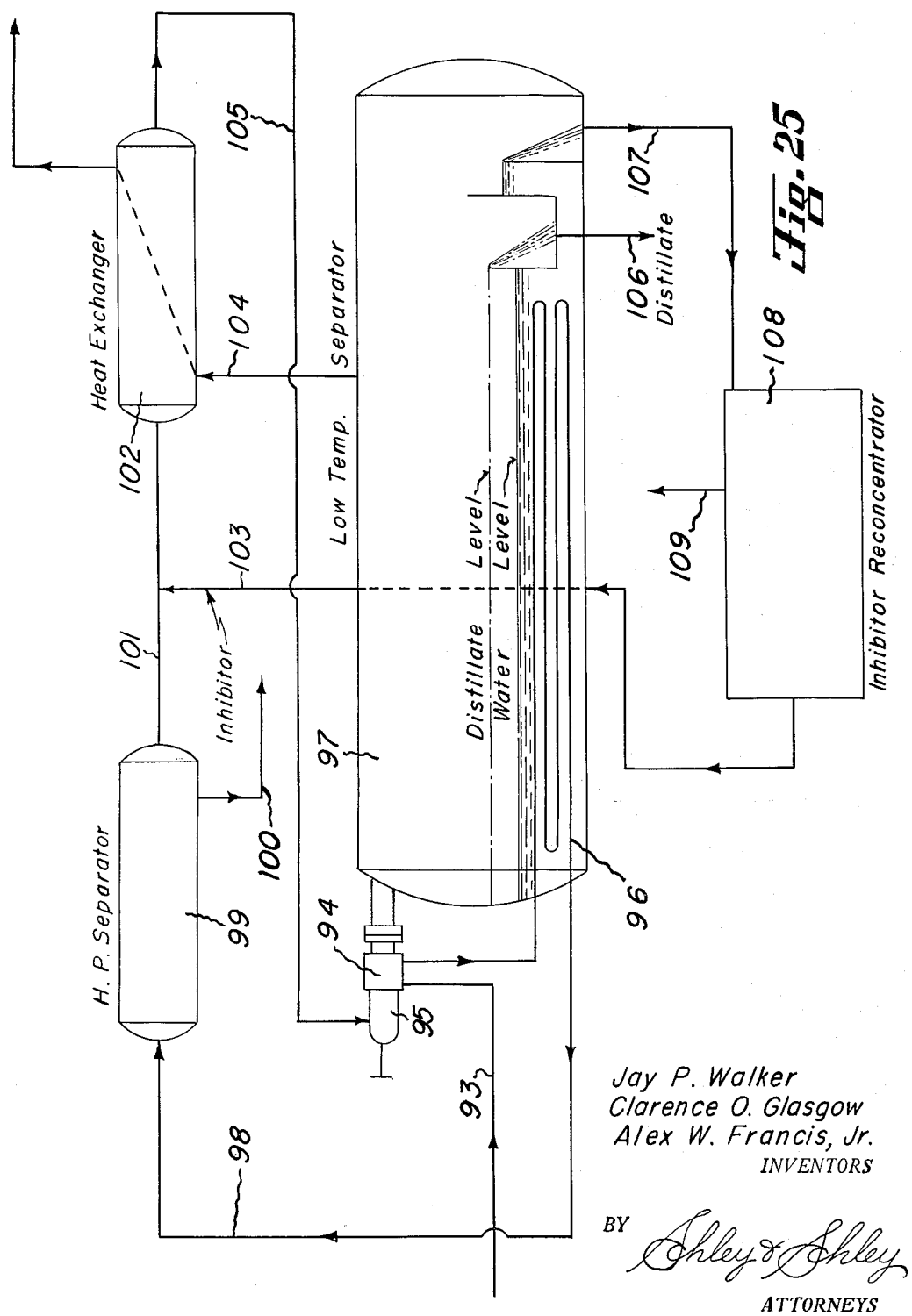

United States Patent Office 2,747,002
Patented May 22, 1956

2,747,002

WELL FLUID SEPARATORS AND METHODS FOR SEPARATING WELL FLUIDS

Jay P. Walker, Clarence O. Glasgow, and Alex W. Francis, Jr., Tulsa, Okla., assignors to National Tank Company, Tulsa, Okla., a corporation of Nevada Application October 24, 1952, Serial No. 316,632

19 Claims. (Cl. 260—676)

This invention relates to new and useful improvements in well fluid separators and methods for separating well fluids.

The invention is particularly concerned with the flow streams of high pressure, or relatively high pressure wells, and the removal from such flow streams of an optimum quantity of readily liquefiable hydrocarbons and the simultaneous or separate removal of water and water vapor so as to reduce the water vapor dew point of the residual gas stream to a desired value.

These are currently produced large numbers of so called "Gas" or "Gas-Oil" wells, flowing at relatively high pressures and producing considerable quantities of gas along with various liquefiable hydrocarbons and water or water vapor. It is to be understood that such wells vary widely in nature, as to flowing pressure, temperature, and the composition of the flow stream. Further, the circumstances attendant upon each well may vary to a marked extent since it may be desirable to remove practically all of the water and water vapor from the flow stream or only to reduce the dew point to a moderate figure, to strip the flow stream as completely as possible of readily liquefiable hydrocarbons or to allow a portion of such hydrocarbons to remain in the residual gas, to flow the residual gas stream into high or low pressure gas transmission pipe lines, to compensate for varying flows or gas demands by the gas transmission pipe lines and to provide recoveries of liquefiable hydrocarbons of various degrees of stability. This invention seeks to provide a solution for all of these problems and to provide other desirable results as will be brought out more fully hereinafter.

An important object of the invention is to provide an improved well fluid separator in which provision is made for reducing the temperature of a well flow stream to low levels to provide maximum recovery of liquefiable hydrocarbons, as well as to provide for greatly reduced water vapor dew points, and in which provision is made for preventing the hampering of the separator action by uncontrolled accumulations of gas hydrates and/or ice.

A particular object of the invention is to provide an improved well fluid separator which is readily adaptable to varying well conditions and to various types of separator operations in which the temperature of well flow steams is reduced to provide maximum recoveries, and in which the well flow stream itself is used as a heat exchange medium for controlling the accumulation of gas hydrates.

A further object of the invention is to provide an improved separator for predominantly gaseous well fluids, wherein separation is had within, and below, the gas hydrate formation range, without impedance due to hydrates, and with a proportional increase in the hydrocarbon liquid recovery.

A still further object of the invention is to provide an improved well fluid separator which may be employed principally for the removal of water and water vapor, or for the removal of readily liquefiable hydrocarbons, or for the removal of both of said well stream components, with provision for stabilization of both the residual gas stream and the recovered hydrocarbons.

A particular object of the invention is to provide an improved well fluid separator employing low temperatures for the removal of liquefiable components from the well stream and involving the formation of gas hydrates, in which the gas hydrates are employed for further reducing the water vapor dew point of the residual gas stream to a very low value whereby said gas stream may safely be passed through gas transmission pipe lines.

An important object of the invention is to provide improved methods of separating well fluids in which optimum recovery of hydrocarbons is effected, and in which low temperatures are employed while provision is made for overcoming the undesirable results encountered in the use of low temperatures; and further, to provide improved methods in which a preliminary separation of the well stream permits the separate expansion of the predominantly gaseous portion of the well stream with the attendant increase in temperature reduction.

A still further object of the invention is to provide improved methods of separating well fluids including the steps of expansion and low temperature separation with heating or cooling steps or heat exchange steps prior to, during, or after the separation step.

A particular object of the invention is to provide improved methods and means of separating well fluids wherein efficient stabilizing of the recovered liquid is effected by passing the gas and liquid components through an elongate, horizontal flow path and subjecting the liquid phase to adequate heat to achieve reasonably complete stabilization of the liquids at this point.

Another important object of the invention is to provide improved methods and means of separating well fluids wherein the liquid and the gaseous portions of the well stream are flowed concurrently in an elongate horizontal path and all counter-current flow of the two components is avoided to provide relatively complete separation of all components of the well stream and in particular, the stabilization of the liquid hydrocarbons.

A particular object of the invention is to provide improved methods and means of separating well fluids wherein an inhibitor or anti-freeze material is incorporated into the well fluids to prevent undesirable congealing or solidification due to low temperatures in which the forming of an emulsion between the inhibitor and the hydrocarbons is reduced if not eliminated; wherein adequate provision is made for the breaking of any such emulsion which may form; wherein any emulsion present is spread in a thin layer for adequate heating and breaking, and wherein any emulsion is retained an extended period of time under such conditions for insuring proper breaking of the emulsion; wherein the inhibitor and the hydrocarbons are separated and separately withdrawn while under high pressure to minimize formation of emulsion; and, wherein the separation of distillate and inhibitor is made while the hydrocarbon is cold and will retain very little of the inhibitor in solution.

A construction designed to carry out the invention will be hereinafter described together with other features of the invention.

The invention will be more readily understood from a reading of the specification and by reference to the accompanying drawings, wherein examples of the invention are shown, and wherein:

Fig. 1 is a side elevational view of a separator system constructed in accordance with this invention and adapted to carry out the methods herein disclosed, Fig. 2 is a plan view of the separator system, Fig. 3 is an end elevational view of the separator system, Fig. 4 is a vertical, longitudinal, sectional view of the low temperature separation unit, Fig. 5 is a vertical, transverse, sectional view taken on the line 5—5 of Fig. 4, Fig. 6 is a horizontal, sectional view taken on the line 6—6 of Fig. 5, Fig. 7 is an enlarged side elevational view, partly in section, of the choke structure, Figs. 8 through 15 are diagrammatic views of different modifications of the invention, illustrating the application of the invention to various well and operating conditions, Fig. 16 is a view similar to Fig. 4, illustrating a modification of the low temperature separator unit, Fig. 17 is a view similar to Fig. 4, illustrating a further modification of the low temperature separator unit, Fig. 18 is a fragmentary view, partly in elevation and partly in section, illustrating another modification of the low temperature separation unit, Fig. 19 is a vertical, sectional view illustrating the invention as applied in a vertical vessel, Fig. 20 is a horizontal, sectional view taken on the line 20—20 of Fig. 19, Fig. 21 is a view similar to Fig. 19 illustrating a further modification of the vertical version of the low temperature separation unit, Figs. 22 and 23 are views similar to Fig. 4, illustrating additional modifications of the low temperature separation unit, Fig. 24 is a vertical, cross-sectional view taken on the line 24—24 of Fig. 4, and Fig. 25 is a diagrammatic view showing a structure and illustrating a method for low temperature separation in accordance with this invention employing an inhibitor for minimizing solidification of well stream components.

This invention is a continuation-in-part of our copending application Serial No. 185,608 filed September 19, 1950, now abandoned.

It is to be noted that the present invention includes many modifications in which the principles of the invention are applied to varying well conditions and varying conditions of disposal of the products obtained. Although a number of modifications are shown, however, the methods herein involved remain basically the same, and the principles of operation of the low temperature separation unit are varied only by embodiment in alternate structures. In Figs. 1, 2 and 3 of the drawings, is shown one embodiment of the invention. In this particular arrangement, there is provided a supporting skid 10 having supported thereon a high pressure separating unit 11, a low temperature separating unit 12, and a heat exchanger 13'. The latter unit forms an essential element of the separator arrangement and is shown in greater detail in Figs. 4, 5 and 6. The low temperature separation unit 12 includes an elongate cylindrical tank 13 carried in a horizontal position upon suitable supports 14. A suitable fluid inlet fitting 15 extends through one end wall of the tank 13, and communicates with a diverter box 16 carried upon the inner wall of the tank and overlying the inner end of the fitting 15. The diverter box 16 is open only at its bottom so as to divert downwardly fluids entering through said fitting 15. Adjacent the fluid inlet fitting, a hollow box 17 depends downwardly from the upper inside wall of the tank 13, including a pair of end plates 18 extending transversely of the tank shell, and a bottom plate 19 having therein an enlarged central opening. A spinner drum 20 is carried within the box 17, the drum being in the form of a relatively shallow, wide cylinder having a closed top 21 and an open bottom 22. A circular pipe coil 23 is welded or otherwise suitably secured to the lower edge of the spinner drum 20, and is also suitably secured within or to the marginal edges of the opening 22 provided in the bottom of the housing 17. Diametrically opposed coupling T's 24 are connected into the circular coil 23, and inlet and outlet pipes 25 and 26, respectively, extend from the coupling T's 24 through opposite side walls of the tank 13.

A tangential gas inlet pipe 27 extends through one side wall of the tank 13, terminating in the wall of the spinner drum 20. An arcuate vertical partition 28 is disposed within the spinner drum 20, overlying the open inner end of the gas inlet pipe 27, and terminating at a point spaced therefrom so as to direct the incoming gas stream circumferentially of the inner portion of the spinner drum. A horizontal bottom plate 29 connects the lower edge of the partition 28 and the wall of the spinner drum so as to prevent the downward passage of gas entering through the pipe 27 until the gas stream has been directed in a circumferential direction. As will be pointed out more fully hereinafter, gas at a very low temperature and flowing at a considerable velocity is introduced through the pipe 27, and the spinner drum 20 functions to direct the gas stream in an arcuate or circuitous path to separate therefrom large and small liquid particles and to reduce the velocity of the flowing gas to the desired point.

One important function of the drum structure is to provide a baffle or deflection member upon which the velocity of the incoming stream may be partially dissipated and to which heat may be supplied to prevent the accumulation of hydrates.

At the opposite end of the tank 13, there is provided a transverse weir plate 30, the plate being substantially semi-circular in shape and projecting upwardly from the lower and side walls of the tank shell. The upper edge of the plate 30 is substantially horizontal, and, as will appear more fully hereinafter, accumulated fluids spill over the upper edge of said plate to collect in the right hand end of the tank 13 for subsequent removal.

A rectangular trough 31 extends transversely of the tank adjacent the weir plate 30 and is positioned between said weir plate and the left hand or inlet end of the separator tank. As appears in Fig. 4, that upper edge of the trough 31 closest to the inlet end of the tank is disposed at an elevation above the upper edge of the weir plate 30 so as to maintain a higher liquid level than that maintained by the plate 30. In practice, a body of water and hydrocarbon products is carried within the tank shell 13, the lighter hydrocarbon products being skimmed off over the upper edge of the trough 31, while the water flows beneath the trough and over the upper edge of the plate 30. A suitable drain pipe 32 leads from the lower portion of the trough 31, while a similar drain pipe 33 extends from the bottom of the tank shell 13 within the accumulation space defined by the plate 30. Suitable liquid level controls 34 extend into the tank shell through lateral openings 35 and control the operation of drain valves 36 connected into the pipes 32 and 33.

A multiple pass heat exchange coil 37 is positioned in the lower portion of the tank shell 13 between the inlet end of said tank and the trough 31. External inlet and outlet connections for the coil 37 are provided so that the well stream may be passed therethrough in heat exchange relationship with the body of fluid present within the tank. In addition, various external fittings are provided for pressure gauges, thermometer bulbs, and the like.

Associated with the low temperature separation unit is a pressure reducing choke 38. The choke 38 may be of the fixed orifice type, or may be manually or automatically adjustable so as to vary the flow area and to permit the passage of varying volumes of fluid. While the particular structure of the choke itself is not critical, a typical long nose choke has been illustrated and includes a choke body 39 having connected thereto a gas inlet pipe 40. The body of the choke is enclosed within a pressure tight jacket 41 having a fluid inlet 42 and a fluid outlet 43. The outlet 44 of the choke is connected to the gas inlet pipe 27 of the low temperature separator unit so that the cold gas stream of reduced pressure which flows from the choke enters directly into the spinner drum structure 20.

Proceeding now with a description of the essential features of operation of the invention, the well stream, which may be under several thousand pounds per square inch pressure and at a temperature of 100 to 150 degrees Fahrenheit, or higher or lower, is admitted through the gas inlet 42 to the heater jacket 41 of the choke 38 and passes therefrom through the outlet 43. The passage of this relatively warm flow of gas through the jacket 41 maintains the choke body at proper operating temperatures and prevents the choke from freezing up due to the accumulation of gas hydrates or ice. The flow stream desirably flows from the outlet pipe 43 to the inlet 25 of the heating coil 23 by means of a suitable conductor 44' (Fig. 3), and passes through the coil 23 to the outlet 26 thereof. The flow stream is still comparatively warm, its temperature having been only very slightly reduced by its passage through the jacket 41, and it thus serves to warm the spinner drum 20 and the space inclosed between said drum and the box 17.

From the outlet 26, the flow stream passes to the coil 37 through a suitable conductor 45 so as to impart a portion of its heat to the coil 37 and the contents of the tank 13. The flow stream may then undergo further handling, as will appear more fully hereinafter, and is eventually returned to the inlet 40 of the choke 38. It may be stated that at least the gaseous portion of the flow stream is passed through the choke 38, and in some instances, the entire flow stream is conducted through the choke body.

Within the choke, the pressure of the flow stream is greatly reduced, resulting in a corresponding temperature drop so that the outlet stream may be at a pressure of several hundred pounds per square inch and a temperature at or below the temperature of hydrate formation for the existent pressure. With this marked temperature reduction, it is obvious that gas hydrates and/or ice will be formed, but by reason of the heating jacket 41, no accumulation of this solid material occurs within the choke body. The combined stream of cold gas, liquefied components, and solid components in the form of gas hydrates and/or ice, passes to the inlet pipe 27 and impinges upon the inner surface of the spinner drum 20. Within this drum, the velocity of the flowing stream is considerably reduced, and at the same time, by centrifugal force and scrubbing, the liquids and solids are removed from the gas stream so as to fall from the open bottom of the spinner drum. The heating coil 23 maintains the drum structure at a temperature sufficient to prevent the sticking or accumulation of gas hydrates and/or ice upon the drum structure, and hence undesirable accumulations of such material is avoided.

The low temperatures which are obtained cause the liquefaction and/or solidification of virtually all the recoverable components of the flow stream, and such components, both water and hydrocarbons, fall into the lower portion of the tank 13. The accumulated body of water preferably covers a major portion of the heat exchange coil 37, while the hydrocarbon components stratify and float upon the surface of said body of water. The separated gas passes longitudinally of the tank 13 and is discharged through a suitable gas outlet connection 46 extending from the upper wall of the tank 13.

With the mode of operation which has been described, the flow stream passes from the well in heat exchange relationship with the pressure reducing choke 38, the spinner drum 20, and the body of water present in the lower portion of the tank 13. It is desirable that the flow stream pass in succession with these elements in the order named, since it is very important that the choke be maintained at a sufficiently elevated temperature and that the spinner drum also be maintained at a temperature above the critical temperature of hydrate formation for the fluid stream passing through said drum under the conditions of temperature and pressure present therein. It is obvious, however, that the order of flow may be reversed or varied so long as the named components of the system are maintained at a proper temperature. As will appear more fully hereinafter, it is not desirable for the body of water present within the tank 13 to be maintained at too elevated a temperature, and because of the larger heat transfer capacity of the relatively large set of coils 37, it is normally preferable that the well flow stream pass first through the heat exchange jacket 41 of the choke and the heating coil 23 of the spinner drum before being introduced into said coils 37.

Although there is some temperature drop in the well flow stream as it passes through the various heat exchange elements which have been enumerated, the magnitude of such temperature drop is relatively small as compared to that ultimately achieved, and there is only a small loss in pressure due to the flow resistance of the system. Within the choke body 39, on the other hand, a pressure and temperature drop of considerable magnitude takes place and the stream of fluid passing through the choke reaches very low temperatures with the resultant condensation and/or solidification of large quantities of the liquefiable components present. Up to this point, the flow stream has been protected against pressure drops and radical temperature changes which might cause the formation of gas hydrates or ice and result in obstructing or clogging of the system. The formation of such solid particles may be tolerated downstream of the choke, however, and in view of the considerable drop in temperature, the formation of hydrates or ice is a normal occurrence.

The low temperature separator unit makes provision for accommodation of the manufactured hydrates in providing large flow spaces and through the utilization of the spinner drum 20 which separates hydrates, ice, and liquefied hydrocarbons and water from the gas stream so that such components may fall or drop into the lower portion of the low temperature separating vessel. At this point, the liquid and solid particles do not interfere with the passage of the flow stream and do not accumulate to such an extent as to result in undesirable impedance or blockage of the system. The liquid components quickly and readily stratify into hydrocarbon and water layers in the lower portion of the tank 13, the water layer receiving heat energy from the coil 37 and thus being maintained at a temperature somewhat higher than that of the stream entering the spinner drum 20. This heat input serves to melt the hydrates and ice which have been formed, and as the latter decompose or disintegrate, the constituents thereof stratify and separate into their proper levels within the vessel 13. In order to prevent the larger particles of hydrates or ice from passing longitudinally of the separator vessel 13 into proximity with the trough 31, a relatively narrow vertical baffle 47 extends transversely of the vessel 13 at a point near the medial portion thereof and remote from the trough 31. The baffle 47 is disposed at such an elevation as to intersect the surface of the hydrocarbon layer and hence functions as a dam to prevent the passage of hydrates or ice thereby. Further, there may be some turbulence created in the surface of the hydrocarbon layer beneath the spinner drum 20 by reason of the impingement of the gas stream thereon, and the baffle 47 effectively functions to quiet such surface disturbances and to isolate the trough 31 therefrom. Thus, the skimming or weir action of the trough, described hereinbefore, is unimpaired and reasonably exact level control is maintained.

There is an important advantage in the use of the weir plate 30 and the trough 31 in that inadvertent draining of the tank 13 is avoided. The plate and trough maintain within the tank a minimum liquid level sufficient to cover the coils 37. All of the control equipment 34 and 36 is so disposed that failure of any sort will not drain tank 13. A faulty float or a leaking or defective valve can only cause drainage of the trough 31 and of the water which has flowed over the weir plate 30. At all times the coils 37 remain covered so as to remain capable of imparting to the unit heat energy for melting hydrates and ice. A draining of the tank 13 would greatly reduce the rate of heat transfer from the coils 37, and would probably result in a clogging of the tank by excessive accumulation of hydrates and/or ice.

The system thus far described is desirably modified in several fashions in accordance with various well conditions which may be encountered. Certain of these modifications are illustrated in Figs. 8 through 15. In Fig. 8, is illustrated essentially the system which has been described, there being included a low pressure separator 48 into which the recovered hydrocarbons are discharged for stabilization and for reduction of pressure to a point at which they may be conducted to the storage tanks (not shown). In the low pressure separator, the pressure under which the stream of recovered hydrocarbons is flowing, may be reduced to the desired value, and in the course of such pressure reduction some evolution of gas from the hydrocarbons will take place. Further, some of the light hydrocarbons, such as propane and butane, will be flashed off and will be discharged from the low pressure separator through the gas discharge line 49. The stabilized hydrocarbons pass to a storage tank through a suitable conductor 50. Of course, the usual pressure valves and connections, and liquid level controls, may be employed upon the separator 48.

It is to be noted that a considerable stabilization of the recovered hydrocarbons is also effected within the low temperature separating unit 12. The layer of recovered hydrocarbons floating upon the surface of the relatively warm body of water present in the bottom of the tank 13, is warmed to a moderate extent by the water, and some evolution of gas and vaporization of light hydrocarbons will take place. This stabilization is continued within the trough 31 which is completely surrounded by the body of relatively warm water, and the hydrocarbons being withdrawn through the outlet 32 will be reasonably stable under the pressure conditions existing. The further reduction of pressure within the low pressure separator 48 completes the stabilization of the hydrocarbon product to an extent sufficient in nearly all instances.

The horizontal disposition of the low temperature separating unit 12 is of considerable importance in several respects. First, the well stream components are introduced at one end of the tank 13 and are withdrawn from the other end thereof whereby the components flow concurrently in an elongate, horizontal path. The avoiding of counter-current flow provides for more efficient and complete separation of the well stream components and the elongate, horizontal flow is also of quite considerable advantage in this respect. The elongate horizontal gas space provided above the liquid level in the tank 13 requires the gaseous portion of the well stream to flow in a long horizontal path to reach the gas outlet, and in this horizontal flow adequate time is provided for the settling of liquid particles from the gas layer. Since the gas is very cold, condensable components in the gas stratum are liquefied and fall into the liquid layer so that the gas leaving the separator does not carry with it any considerable portion of the liquefiable hydrocarbons present in the well stream. This elongate, horizontal flow is also important in efficient separation of the distillate and water and provides ample time and opportunity for complete stratification of the two liquids into their respective levels. The maintenance of concurrent flow of the components prevents the creation of turbulent conditions in which one component must flow upwardly through a space while another component is flowing downwardly therethrough and the net result is more complete separation of the well stream components along with a considerably increased capacity of the separator to handle large volumes of flow.

The horizontal flow path is also important in that it provides a quite considerable degree of stabilization of the recovered distillates. It is desirable that the distillates have a relatively low vapor pressure so that the same may be handled and stored without requiring special equipment and tanks, and so that any "weathering" loss from the distillate after removal from the low temperature separator shall be kept at a minimum. At the same time, it is important that the gas be discharged without any appreciable content of heavy or valuable hydrocarbons therein in order not only that substantially all of the liquefiable hydrocarbons be recovered in the distillate layer in the low temperature separator, but also that difficulties due to condensation and the like in the discharged gas be avoided.

Since the distillate layer in the low temperature separator is constantly receiving heat from the heating coils through the water layer, there will be some volatilization of hydrocarbons from the distillate layer. In accordance with well established physical laws, such vaporization by heating of a body of mixed hydrocarbons results primarily in a vaporization of the lighter hydrocarbons, and only to a secondary extent in vaporization of the heavier hydrocarbons. Stated in another fashion, a greater percentage of those lighter hydrocarbons present are vaporized, and a somewhat lesser percentage of the heavier hydrocarbons present are vaporized. This is true even though the heavier hydrocarbons predominate in the distillate layer. Hence, the warming or heating of the distillate layer results in preferential volatilization of the lighter hydrocarbons.

These vapors and gases upon breaking through the surface of the distillate layer and entering the gaseous stratum encounter the very cold temperatures existent in the gas stratum, and condensation promptly occurs. Again, according to well established physical laws, when a mixture of hydrocarbons in the gaseous phase is subjected to cooling, the chilling action causes preferential condensation of the heavier hydrocarbons. Thus, a phenomenon occurs which is opposite to that encountered in volatilizing hydrocarbons from the liquid layer, and a greater percentage of the heavier hydrocarbons present in the gaseous layer condense, while a somewhat lesser percentage of lighter hydrocarbons condense. The net result of this vaporization and condensation is a preferential concentrating of the heavier hydrocarbons in the liquid layer and a preferential concentrating of the lighter hydrocarbons in the gaseous stratum.

Because of the length of the low temperature separator and the elongate, horizontal flow path provided thereby, this vaporization and condensation cycle may occur a number of times as the well fluids pass from one end of the vessel to the other, and experience has shown that such repetition of the cycle apparently does occur. Experience under actual operating conditions has shown that this particular structure and this particular method not only provides increased capacity and higher separating efficiency, but also results in very good stabilization of the hydrocarbon product. As contrasted to a vertical vessel, a 3 feet by 10 feet horizontal low temperature separator of the type illustrated has approximately 30 sq. ft. of liquid surface exposed to the gaseous layer through which vaporization and condensation may take place. A 3 feet by 10 feet vertical vessel would have only about 7 sq. ft. of surface so exposed, and yet must handle the same volume of liquid and gas. Elongation of the horizontal vessel will add to its capacity and stabilizing ability whereas elongation of the vertical vessel will not increase either its capacity or the stability of the products it separates.

This stabilizing action may be carried to a higher degree by supplying more heat to the bottom of the low temperature separator, or by supplying heat at a higher temperature. Instead of passing the well stream through the coils 37, steam, hot water, or other heated liquids, gases or vapors may be passed through the coils in order to elevate the temperature of the water layer and the distillate layer, and hence, to provide for increased vaporization from the distillate level. The temperature of the gas stratum is little affected, if any, by this arrangement whereby the same condensation facilities are available to condense the hydrocarbons. With this arrangement, stabilization can be carried out to a quite reasonable degree, and the need for subsequent treatment of the recovered distillate or hydrocarbons may be entirely eliminated.

It is specifically within the contemplation of this invention to introduce steam, which may be low pressure steam, or hot water, which may be under pressure, to the heating coils 37 at temperatures of 150° to 300° F. or thereabove or therebelow, in order to enhance the stabilization achieved by the present structure and by the methods constituting an important aspect of this invention. It is pointed out that this step does not include merely the heating of a body of distillate for stabilization, but comprises the heating of the distillate under the conditions and circumstances set forth herein wherein the distillate and a superposed gas stratum are flowing concurrently in an elongate horizontal path under conditions encouraging the repeated vaporization and condensation of hydrocarbon components.

The arrangement shown in Fig. 8 has been found desirable for use with wells having high flowing pressures, relatively low quantities of hydrocarbons present in the gas stream, small volumes of liquid water present in the gas stream, and a flowing temperature 10 to 15 degrees Fahrenheit above the temperature of hydrate formation at such flowing pressure. In the case of wells having similar operating characteristics but having considerably larger quantities of hydrocarbon present within the gas stream, or considerable quantities of liquid water present therein, an arrangement such as that shown in Fig. 9 is desirable. In this case, an additional system component in the form of a high pressure separator 51 is incorporated in the flow line between the coil 37 and the inlet 40 to the choke 38. The high pressure separator may be of any suitable or desirable type, the separator disclosed in Patent No. 2,349,944 having been found suitable. Within the separator 51, the well flow stream, which is largely gaseous, is thoroughly scrubbed and liquid components are separated therefrom so that the gas stream passing to the choke 38 is relatively dry. The separated liquids are passed through a conductor 52 to the inlet fitting 15 of the low temperature separation unit 12, and hence are directed by the diverter 16 into the water and hydrocarbon layers present within the tank shell 13.

The removal of a considerable portion of the liquid and liquefiable components from the well flow stream before the latter enters the choke 38 reduces the tendency for the choke to freeze up due to hydrate and/or ice formation and also enhances the cooling effect observed in the gas stream passing through said choke, since the entire cooling effect is expended upon the gas stream with the net result that the refrigeration effect is utilized most efficiently; that is, upon that portion of the flow stream containing valuable and liquefiable components which are yet in the vapor phase. Nothing is to be gained by further cooling of those components already liquefied, and instead, the refrigerating action is reserved for application to the gaseous stream.

It is to be noted that the function of the high pressure separator 51 will depend to some extent upon the nature of the well stream, and that this separator structure might well be termed either a high pressure separator, a water knockout, or a combination of the two. Thus, in the form of the invention shown in Figs. 1 through 3, the liquid knockout 11 is employed upstream of the pressure reducing choke and functions as the separator 51 to remove liquid components from the flowing stream before the latter enters the choke 38.

Those liquids or fluids removed in the knockout 11 or the separator 51, may include various hydrocarbons, water, and certain quantities of gas. As pressure reduction of this liquid stream takes place in its passage from the knockout or separator to the inlet fitting 15, there will be further evolution of gas which must be separated in the low temperature separating unit 12. The stream entering through the fitting 15 will be relatively warm as compared to the cooled stream entering through the pipe 27, but the liquid phase components thereof will drop readily and quickly into the hydrocarbon and water layers, while the gaseous portion thereof will rapidly reach temperature equilibrium with the cool gas present in the upper portion of the tank 13. This temperature equalization results in condensation of further desirable fractions and also the removal of water from the relatively warm and wet gas entering through the fitting 15. This is true because the volume of gas flowing through the inlet 15 is relatively small as compared to the volume entering through the pipe 27.

It is further to be noted that all of the gas is passing in contact with gas hydrates which have been formed in the choke 38 and which have settled beneath the spinner drum 20. It is known that the vapor pressure of gas hydrates is lower than that of an aqueous system at the same temperature. For this reason, gas hydrates function as desiccating agents, and are here utilized for further drying of the commingled gas streams so that the water vapor dew point of the gas flowing from the gas outlet 46 is lower than the temperature of said gas and is also lower in most cases than the minimum gas temperatures obtained anywhere in the system. As an example, the outlet temperature of the choke 38 may be 10 degrees Fahrenheit, whereas the water vapor dew point of 0 degree Fahrenheit may be observed at the gas outlet 46. This further dehydration of the produced gas enhances its suitability for handling in gas transmission pipe lines and substantially eliminates the possible later formation of gas hydrates or the condensation of water from the gas stream.

The box 17, in shielding and insulating the spinner drum 20, both serves to maintain the metal of said spinner drum at a temperature above the water vapor dew point of the gas entering through the pipe 27, and also shields the relatively cool spinner drum from the gas evolved from the separated liquid entering through the fitting 15. The dew point of the gas passing into the unit 12 through the fitting 15 is considerably higher than the dew point of the gas entering through the pipe 27 since there has been substantially no temperature reduction within the separator 51 and no condensation of water from the gas entering from this source. The latter gas is thus caused to flow under the open lower end of the drum 20 and is prevented from coming in direct contact with said drum with the resultant condensation and freezing of water vapor. Here again, the formation and accumulation of gas hydrates and/or ice is regulated and controlled so as to be employed beneficially and so as to eliminate difficulties arising from uncontrolled formation of such materials.

There is virtually no upper limit to the pressure ranges of gas production which may be employed beneficially in this system, nor may any arbitrary lower pressure limit be set. It is only necessary that the pressure be such, both upstream and downstream of the system, as to permit a sufficient temperature drop to give the enhanced hydrocarbon recovery which is being sought. One arrangement for handling low pressure production is illustrated in Fig. 10 which is again very similar to the first form of the invention described with the exception that a heat exchanger 53 has been incorporated into the flow line extending between the coils 37 and the inlet 40 to the choke 38. The heat exchanger 53 may be of any suitable or desirable type, an ordinary tube and shell exchanger having been found extremely satisfactory.

As a cooling medium, the discharge gas flowing from the gas outlet 46 is employed, this gas being at a relatively low temperature because of its expansion through the choke 38. The discharge gas is conducted to a diaphragm operated three-way valve 54 having one outlet connected through a suitable conductor 55 to the shell of the heat exchanger 53, and the other outlet connected through a pipe 56 to the discharge line 57 leading from the shell of said heat exchanger. The three-way valve 54 is operated by a suitable temperature controller 58 which may have its temperature sensitive bulb 59 connected into the inlet of the choke 38, as shown in Fig. 10, or connected into the shell of the low temperature separator unit 12. In either case, the temperature bulb responds to the temperature of the gas flowing through the choke 38, and through the controller 58 regulates or throttles the valve 54 to proportion the flow of cold discharge gas through the conductors 55 and 56. Such proportioning causes a quantity of cold discharge gas to flow through the heat exchanger sufficient to reduce to the desired temperature the well flow stream passing through said heat exchanger. In this manner, additional cooling of the flow stream is obtained, and this cooling, coupled with the cooling obtained in the choke 38 provides a sufficient temperature drop to result in the increased hydrocarbon recoveries characteristic of this system. This arrangement has been found eminently suitable for wells having relatively low flowing pressures, lean gas, that is gas containing relatively small quantities of liquefiable hydrocarbons, relatively small volumes of liquid water, and a moderately high flowing temperature. In such wells producing a rich gas or a high volume of liquid water, it may further be desirable to add the high pressure separator and/or water knockout 51 of Fig. 9, this alternate arrangement being illustrated in Fig. 11. In each case, the utilization of the low pressure separator 48 is also desirable.

It is necessary that the flow stream or gas stream reach the inlet of the choke 38 at a temperature above its point of hydrate formation at the operating pressure being employed. At pressures of several thousand pounds per square inch, this critical temperature of hydrate formation may be in the neighborhood of 70 to 80 degrees Fahrenheit, and hence, in wells flowing at relatively low temperatures some heating of the influent stream may be necessary or desirable. There is illustrated in Fig. 12 an arrangement suitable for those conditions, wherein any suitable or desirable type of heater 60 is incorporated in the flow line leading from the well to the separating system. Desirably, the heater is provided with a by-pass line 61 connected into a three-way valve 62 operated by a diaphragm 63 and temperature controller 64. The temperature bulb 65 of the temperature controller 64 may again be connected into the system at any desirable point. Since most heaters are gas fired, however, and constitute a fire hazard, it is considered good practice to space them a considerable distance from a high pressure separator unit of the type described herein, and therefore, on a practical basis, the temperature control bulb 65 is usually connected into the discharge line of said heater. Nevertheless, within the limitations of available equipment, the temperature bulb may be connected at any suitable point in the system for controlling the temperature to which the heater elevates the incoming flow stream.

The system illustrated in Fig. 12 may further be modified in accordance with high or low well pressures, rich or lean gas production, and high or low volumes of liquid water in the well stream. As pointed out hereinbefore, the high pressure separator and/or water knockout 51 may advantageously be incorporated into the system where the gas production is rich in liquefiable hydrocarbons or contains high volumes of liquid water. The heat exchanger 53 is desirably added in the case of relatively low flowing pressures which limit the pressure reduction and temperature reduction available in the choke 38.

There are some wells which flow at relatively high temperatures of the order of 140 degrees or 150 degrees Fahrenheit, or even higher, by reason of high bottom hole temperature and relatively high flow rates. In such cases, provision is desirably made for reducing to some extent the temperature of the flow stream before it enters the coils 37 since too high a temperature at this point may result in the loss of valuable hydrocarbons from the layer thereof floating upon the body of water in which the coils are submerged. Also, high water temperatures tend to increase the water content of the discharge gas and the hydrocarbon layer. This problem may be met by a by-passing of a portion of the flow stream around the coils 37. In the alternative, a heat exchanger, such as the heat exchanger 53, may be employed for this purpose, the cooling medium being the discharged gas flowing from the low temperature separation unit, and the heated medium being the flow stream which may be conducted through the heat exchanger at any point prior to its entry into the coils 37. Here again, the three-way valve 54 may be employed for control purposes, and thus it is apparent that the heat exchanger may be employed either in cases where the well flow stream is too warm, or where the flowing pressure is too low to provide adequate cooling by pressure reduction in the choke 38. Of course, the use of the heat exchanger prior to the coils 37 functions to solve both problems in that the entire flow stream is cooled preventing overheating of the coil 37 and possible vaporization of hydrocarbons within the low temperature unit 12, and as well, preliminary cooling is obtained which is supplemental to the final cooling achieved in the choke 38 to provide an overall temperature gradient of a magnitude sufficient to permit adequate hydrocarbon recoveries and/or water vapor dew point depression. The high pressure separator and/or water knockout may be incorporated in any of the described systems where relatively high quantities of liquid are present in the flow stream, and the low pressure separator 48 is desirably employed in all of the systems for stabilizing the hydrocarbon product before it passes to the storage tanks.

As stated hereinbefore, there is virtually no upper pressure limit for the inlet flow to this system with the exception that no particular advantage is obtained above about 3500 pounds per square inch for the reason that pressure drops above that range result in very small temperature changes and hence very little additional recovery of liquefiable hydrocarbons. It is also stated herein that no definite lower pressure limit may be set as a minimum inlet pressure since this factor will depend upon the type of well production being handled both as to temperature and pressure, as well as to the quantity and nature of liquefiable hydrocarbons present in the well stream. It must be taken into consideration that the downstream discharge pressures may vary considerably depending upon the disposition of the discharged gas. The gas may be flowing into a gas transmission pipe line at a pressure anywhere from 100 to 1200 pounds per square inch, the temperature conditions may vary considerably, and the quality of discharge gas may also vary to a large extent. In some cases, a low water vapor dew point is not necessary or desirable, while in others, a very low dew point must be maintained. In some cases, the apparatus may be employed simply for the removal of water vapor and liquid water, the hydrocarbon and gas stream being recombined for transmission to a remote separating point. In general, it may be stated that there should be available a sufficient pressure drop to give enough cooling of the well stream over and above that achieved through ordinary separating practices to increase the recovery of hydrocarbons to such an extent as to justify the employment of the present system. In most cases, the maximum possible pressure reduction will be employed so as to achieve the greatest temperature drop and the maximum recovery of liquefiable components. An exception would be a case in which the B. t. u. content of the discharged gas did not meet requirements so that it became necessary to leave an additional quantity of the hydrocarbons in the gas stream in order to maintain a predetermined minimum B. t. u. content.

As pointed out hereinbefore, the coils 37 are immersed in the body of water present in the lower portion of the tank 13, this arrangement being important in that the heat transfer characteristics of water are vastly superior to such characteristics of hydrocarbon liquids. Therefore, the rate of heat transfer from the coils 37 is enhanced so that there is a supply of heat energy adequate to melt the hydrates created in the pressure reduction step. The separate pressure reduction of the gas and liquid streams, in the cases where the high pressure separator or water knockout 51 is employed, is also of advantage for the fact that the separated liquids are not subjected to the very low temperatures of the reduced pressure gas stream so that such liquids enter the tank 13 with an appreciable heat content. This heat content is also employed in melting the hydrates which are present. At the same time, the incoming liquid is flashed to some extent upon entering the tank 13 and is thereby stabilized. As pointed out hereinbefore, the stabilization is increased both by the contact between the hydrocarbon layer and the relatively warm body of water, and by the presence of the body of cold gas existent within the upper portion of the tank 13. There is thus obtained a continuous vaporization of light hydrocarbons from the hydrocarbon layer into the body of cool gas and a simultaneous condensation of certain of the hydrocarbons from the gas phase into the layer of hydrocarbon. This stabilization takes place progressively throughout the length of the tank 13 and approaches completeness toward the discharge end of the tank.

Some additional degree of stabilization may be obtained by use of the modified structure of the low temperature separation unit illustrated in Fig. 16. This unit is substantially identical to that shown in Fig. 4 with the exception that a horizontal condensing plate 66 extends transversely of the tank 13 immediately above the upper surface of the hydrocarbon layer therein. A vertical sealing plate 67 extends between the right hand end of the plate 66 and the upper wall of the tank shell whereby gas and vapors evolved from the water and hydrocarbon layers are forced to flow in intimate contact with the underside of the condensing plate and the exposed hydrocarbon layer in order to reach the discharge connection 46. The plate 66 will be at a relatively low temperature by reason of its exposure to the body of cool gas in the upper portion of the tank 13 and thus will serve as a cool condensing surface upon which liquefiable hydrocarbons may condense and coalesce.

This structure may further be modified as shown in Fig. 17 by the addition of longitudinal baffle plates 68 in the space between the condensing plate 66 and the upper wall of the tank shell. The baffle plates serve as a mist extractor to remove all droplets and fine particles of liquid from the gas stream before discharge so as to obtain a maximum hydrocarbon recovery. Substantially the same results may be obtained by the positioning of a suitable mist extractor 69 (Fig. 18) within the tank shell 13 and in communication with the inlet to the discharge pipe 46. Liquids removed in the mist extractor 69 are conducted through a drain pipe 70 into the body of stratified liquids and are thus recovered therewith.

In principle, the low temperature separation unit 12 involves the spinner drum 20 for effecting an initial separation of liquid particles from the reduced pressure gas stream, means for maintaining the heat of the spinner drum to prevent the undesirable accumulation of hydrates and to control such accumulation in the most suitable manner, with the alternate inclusion of a preliminary high pressure separator for separating from the well flow stream the already liquefied constituents and the introduction of such separated constituents either separately into the vessel 13 or into the spinner drum 20 in conjunction with the flow of low pressure gas. The unit necessarily includes the temperature control coil 37 for obtaining melting of the hydrates and/or ice and an area of stratification and gas separation from which the denuded gas stream may be drawn and from which the separated water and hydrocarbons may be taken off either separately or together.

These features and principles are readily incorporated into alternate structures, one of which is shown in Figs. 19 and 20. In this modification, the teachings of the invention are incorporated into a vertical type low temperature separating unit rather than the horizontal type previously described. The modification includes an elongate vertical tank 71 having the spinner drum 20 disposed transversely of its medial portion. The shielding box 17 and the heating coil 23 are also included as well as the gas inlet pipe 27 and the jacketed choke 38 which is connected to the inlet pipe 27.

The well flow passes through a conductor 72 into the jacket 41 of the choke 38 and flows from said jacket through a conductor 73 to the heater coil 23. From the coil 23, the relatively warm well stream is passed through a conductor 74 to heater coils 75 disposed in the lower portion of the vessel 71 and functioning in a manner similar to the coils 37.

The well stream is then conducted via a suitable pipe 76 into a set of annular coils 77 disposed in the upper portion of the vessel 71 and lying contiguous to the inner wall thereof. From the coil 77, the well stream passes by a pipe 78 to the inlet 40 of the choke 38. For shielding purposes, a cylindrical shell 79 is positioned in the upper portion of the vessel 71, extending concentrically thereof through the annular coil 77 and having its lower end positioned a short distance above the lower end of the box 17. An annular flange 80 extends outwardly from the lower end of the shell 79 and closes the space between the lower end of said shell and the inner wall of the tank 71.

The incoming well stream may or may not be passed through a heater 60, as shown in Fig. 12, and also may or may not be passed through a preliminary high pressure separator and/or water knockout, as shown in Fig. 9. The addition of one or both of these supplementary items of equipment will depend, of course, upon the well conditions encountered. Following whatever preliminary treatment is employed, however, the flow stream enters the heating jacket 41 of the choke 38 for maintaining the choke at a proper temperature, and thence passes to the coil 23 for imparting heat to the spinner drum 20 and preventing the accumulation of hydrates or ice thereon or therein. The relatively warm stream then passes through the coils 75 and 77 before entering the choke 38 and undergoing both temperature and pressure reduction. The thoroughly chilled stream enters the spinner drum 20 through the pipe 27 and undergoes the separation and reduction of velocity discussed hereinbefore. The separated liquids fall into the lower portion of the vessel 71 along with hydrates and ice which may be present, while the separated gas flows upwardly between the box 17 and the shield 79. The coils 77 maintain the shield 79 at a temperature above the water vapor dew point of the gas at this point, as well as above the critical temperature of hydrate formation for the conditions present. Hence, the heating coil 77 serves to prevent the accumulation of hydrates or ice in the upper portion of the vessel and prevents clogging or obstruction thereof. If desired, the mist extractor 69 may be positioned in the upper portion of the vessel 71 in communication with the inlet to the gas discharge line 81 which leads from the upper portion of the vessel 71. Of course, the heat exchanger 53 and low pressure separator 48 may be employed in conjunction with this low temperature separation unit as necessary or desirable and in accordance with the conditions set forth hereinbefore.

The structure of Fig. 19 may desirably be modified to some extent as illustrated in Fig. 21. In this modification, the box 17 and shield 79 are omitted, and instead, an elongate upright tower 82 extends upwardly from the upper surface of the drum 20, defining a peripheral annulus 83 within which the heating coil 77 is disposed. With this modification, the separated gas is caused to flow upwardly through the annulus 83 and over the coils 77, and because this discharge gas is at a low temperature, the coils 77 are caused to function as a heat exchanger. Desirably, a by-pass line 84 is connected around the coil 77, and the three-way valve 85 is employed for proportioning the flow through the coil 77 and the by-pass 84. This arrangement replaces the structure of the heat exchanger 53, incorporating the same into the structure of the low temperature separation unit and eliminating the need for a separate heat exchanger. The function of the structure is, of course, generally the same as that of the structure shown in Fig. 19.

The horizontal type low temperature separation unit may also be modified as shown in Fig. 22. This modification is substantially the same as that shown in Fig. 4 with the exception that the spinner drum 20 and box 17 are omitted and are replaced by a vertical cylindrical drum 86 extending through the upper wall of the tank 13. The lower edge of the drum 86 projects downwardly a short distance within the interior of the vessel 13 to form a depending skirt 87, and the heater coil 23 is suitably affixed to the lower edge of said skirt. The gas or flow stream enters the drum 86 through one side wall by means of an inlet pipe 88, and is preferably directed tangentially within the interior of the drum, the circumferential flow of the stream being encouraged and enhanced by means of a diverter 89 overlying the inlet from the pipe 88 to the shell 86. By reason of the close positioning of the lower marginal edge of the drum 86 to the curved inside upper wall of the vessel 13, the inlet fittings 25 and 26 for the coil 23 are replaced by inlet and outlet elbows 90 and 91, respectively, which are connected into the coil 23 and extend through the upper wall of the vessel 13 for suitable connection into the flow stream.

The operation of this modification is substantially the same as that previously described, the incoming gas stream undergoing a centrifugal separation and a scrubbing action within the drum 86 so that the liquid particles may coalesce and fall into the lower portion of the vessel 13 while the velocity of the gas is reduced to an extent sufficient to permit it to flow from the open lower end of the drum 86 into the vessel 13 without undue agitation and disturbance of the body of stratified liquids present in the lower portion of said vessel. It is to be noted that a major portion of the drum structure 86 is removed from the path of the gas entering through the inlet fitting 15, and that that portion of the drum positioned within the tank shell 13 is relatively small so as to receive ample heat from the coil 23. Hence, no external shielding of the drum 86, as by the box 17, is required. The balance of the separator unit is substantially identical to that shown in Fig. 4.

As shown in Fig. 23, the heat exchange coil structure 77 of Fig. 19 may well be applied to the horizontal type low temperature separation units of Figs. 4, 16, 18 or 22. The structure shown in Fig. 23 is substantially the same as that shown in Fig. 4, except that a set of heat exchange coils 92 is positioned within the upper portion of the tank 13 between the box 17 and the gas outlet 46. The coils are above the liquid level so as to receive cooling from the cold discharge gas, and the well stream or a portion thereof may be conducted through the coils at any point prior to introduction into the choke 38 for pre-cooling.

It is apparent that the invention is subject to much modification and to many alternate applications. The incoming well flow stream may be either heated or cooled as conditions may warrant, both the heating and the cooling being accomplished either through heat exchange or by separate heating or cooling facilities. This initial phase may be considered as an adjustment of the temperature of the well stream to a range found most desirable or preferable for operation of the low temperature separation unit.

This flow stream of adjusted temperature is then employed for maintaining the choke body at a proper operating temperature, for supplying heat to the body of liquid present within the low temperature separation unit, and for maintaining the various spinner drum structures which have been described at such temperatures that the accumulation of hydrates and/or ice may be controlled to permit continuous operation of the unit. In some instances, the temperature of the flow stream following the carrying out of these heat control functions, may further be adjusted by means of suitable heat exchangers which pass the flow stream, or the gaseous portion thereof, in heat exchange relationship with the discharge gas from the low temperature separation unit. It has been found that a more accurate temperature control is obtainable by use of the heat exchanger structure, both because heating units must normally be positioned a considerable distance from the separation units, and because more accurate temperature control is inherently obtained by means of a heat exchanger than is possible with the usual type of heating unit.

A further addition to the system, depending upon the characteristics of the flow stream is the high pressure separator and/or water knockout 51 which is employed for initial separation of the liquid constituents of the well stream prior to the cooling of the gaseous portion of said well stream through pressure reduction. As pointed out hereinbefore, the low pressure separator 48 may desirably be employed in any or all of the various modifications and alternate arrangements which have been discussed.

Still further, the supplying of heat to the lower portion of a low temperature separator may be effected by means of steam, hot water, or other heated fluids in order to enhance and facilitate the stabilization of the recovered liquid hydrocarbons. This addition is of value only in the horizontally-disposed low temperature separators and is not thought to be of value in the vertical modifications (shown in Figs. 19 and 21) because the latter do not provide the elongate, horizontal liquid-gas stabilizing interface.

In Fig. 25 of the drawings there is illustrated diagrammatically a low temperature separation unit somewhat similar to those previously described but in which provision is made for utilizing an inhibitor or antifreeze material. As pointed out hereinbefore, gas hydrates tend to form in the well stream as the temperature thereof is reduced, the precise temperature of formation being dependent upon factors such as the pressure of the stream and the composition thereof. In general, however, the hydrates form at temperatures well above the freezing point of water, and hence, limit the temperature reduction which may be employed at various points in the low temperature separation unit. In particular, hydrate formation limits the degree of cooling which may be achieved in the heat exchanger prior to passage of the well stream to the pressure reducing choke or valve, and consequently, undesirable limitations in the system are sometimes encountered. One case in which such limitations become critical occurs when the available pressure drop is necessarily restricted to several hundred pounds per square inch. Not all wells produce well fluids at extremely high pressure, and over the productive life of any particular well, the reservoir pressure may tend to decline with the net result that inlet pressures of possibly 1200 or 1500 pounds per sq. in. may be the maximum available. At the same time, the pressure employed in natural gas transmission pipe lines has increased as pipeline technology has advanced, and the downstream or outlet gas pressure of a low temperature separation unit may be from 750 to 1000 lbs. per sq. in. or even greater. Since the temperature reduction of the well stream as it passes through the pressure reducing choke is directly dependent upon the pressure drop observed across the choke, this reduction in permissible pressure drop necessarily results in a reduced degree of cooling. Therefore, it is desirable that the temperature of the well stream be lowered to a considerable degree before it enters the choke. This can be done by means of the heat exchanger if the well stream is protected by an inhibitor or antifreeze compound during this preliminary cooling step. Since cooling of the well stream only to the hydrate point before the stream enters the choke would not always be adequate to provide the desired overall cooling of the stream, it sometimes becomes necessary to go below the hydrate point in the heat exchanger, and at this point, the use of a suitable inhibitor is indicated.

Any suitable or desirable type of antifreeze material may be employed, calcium chloride solutions and other brines being common in the art, as well as the glycols, such as ethylene glycol, diethylene glycol, triethylene glycol, and other organic and inorganic materials.

The utilization of an inhibitor also has advantages in cases where an adequate pressure drop is available since it allows a greater temperature reduction prior to pressure reduction of the flow stream, and where desired, will permit the bringing of the entire well stream to a lower temperature by reason of increased cooling prior to pressure reduction. The heating coils in the low temperature separator are desirably used in addition to the employment of the inhibitor, as shown in the following examples:

1. Assuming an inlet pressure of 1500 lbs. per sq. in. and an outlet pressure of 800 lbs. per sq. in., and the use of triethylene glycol as an inhibitor, a glycol concentration of about 35% by weight in the aqueous phase of the well stream would protect the stream against congealing or hydrate formation to a temperature of about 55° F. Expanding this stream into the low temperature separator would give a temperature after pressure reduction of about 27° F. If the inhibitor were not present, the stream would tend to form hydrates at about 68° F., as the well stream would necessarily have to be held at a temperature approximating that level up until it entered the pressure reduction choke. The heat exchanger could not be used for cooling below 68° F. If, on the other hand, the heating coils in the low temperature separator were not employed, a glycol concentration of about 56% concentration by weight in the aqueous phase would be required to prevent hydrate formation.

2. Assuming an inlet pressure of about 2000 lbs. per sq. in. and an outlet pressure of 800 lbs. per sq. in. with triethylene glycol being used as the inhibitor, the well stream would have a hydrate expectancy point of about 72° F. if no inhibitor were added. The addition of 20% by weight of the glycol to the aqueous phase would depress the hydrate expectancy point to about 66° F., and the expansion to 800 lbs. per sq. in. pressure in the low temperature separator would give a resultant temperature of the well stream of about 19° F. Unless the heating coils were present in the low temperature separator, a glycol concentration of about 63% by weight would be required to protect the system.

Thus, the combination not only reduces the quantity of inhibitor required but permits the retaining of low temperatures prior to pressure reduction, and, therefore, the attaining of a lower final temperature.

It is not always desirable to employ the lowest attainable temperature in the low temperature separator because of the overall economics involved. A gas which is fairly rich in liquefiable hydrocarbons and from which considerable quantities of liquid hydrocarbons may be separated, should sometimes be handled at a higher temperature than a very lean gas. This is true because the separated liquids are relatively cold and will contain quantities of gas in solution. As the pressure is reduced upon these liquids and they approach ambient temperature, the gases come out of solution and may be lost. In any event, they are recovered at a somewhat lower pressure, and are not readily placed in the gas transmission pipeline without compression. Since this gas has value, its loss is an economic disadvantage, and from an overall economic viewpoint, it is sometimes better to operate the low temperature separator at a slightly higher temperature to reduce the quantity of gas dissolved in the recovered liquids. The nature of the recovered hydrocarbons also has an effect in that the various hydrocarbons have different absorptive capacities for the light gases such as methane and ethane, and it is apparent that an optimum operating temperature will depend upon both the gas oil ratio of the well stream and the composition of the liquid hydrocarbons.

On the other hand, a relatively lean gas may often be run advantageously at the lowest obtainable temperature since the quantities of recovered liquids are relatively small in volume and will carry off only small quantities of dissolved gas.

Referring now in more detail to Fig. 25 it is seen that the well stream enters through a flow line 93 and passes through the warming jacket 94 of the choke 95. The well stream then passes through the heating coils 96 of the low temperature separator 97, the coils being disposed entirely below the water level and functioning to supply heat as required to the separator.

The well stream then passes through a pipe 98 to a high pressure separator or knockout 99 in which any liquids present are removed and drawn off through an outlet pipe 100. The gaseous portion of the well stream then flows by a conductor 101 to a heat exchanger 102, a suitable inhibitor being injected into the well stream at this point through a pipe 103. The well stream, now protected to a relatively low temperature, is cooled in the heat exchanger 102 by indirect heat exchange with the cold gas leaving the low temperature separator 97 through the gas outlet pipe 104, and in this chilled condition passes to the choke 95 by the conductor 105. Within the choke 95, the well stream undergoes a pressure reduction, causing additional chilling and the other steps and results herein set forth. The liquefied portion of the well stream stratifies within the separator 97, the distillate being drawn off through an outlet pipe 106, while the aqueous portion is removed through an outlet 107. This aqueous phase is taken to a suitable reconcentrator 108 wherein water vapor is driven off through an outlet 109, and the inhibitor is supplied to the pipe 103 as required for injection into the pipe 101.

An antifreeze material or inhibitor such as ethylene glycol or diethylene glycol will form an emulsion with distillate, and it is desirable not only to minimize this emulsification but to insure its destruction in order that all of the distillate may be recovered and none of the inhibitor wasted. Inhibitors have an appreciable cost and it is therefore additionally desirable that the loss of the inhibitor by solution in the distillate be kept at a minimum.

All of these desirable results and advantages are achieved by the structure shown and by the methods carried out therein. Since relatively low temperatures exist in the low temperature separator 97, the layer of distillate is at a relatively low temperature whereby the solubility of the inhibitor, such as glycol, in the distillate is at a substantial minimum. It is to be noted that the hydrocarbon or distillate phase and the aqueous phase are separated under the low temperature and high pressure conditions of the separator 97 and that these two phases are drawn off separately. A common outlet pipe for the two liquid phases would result in the creation of additional quantities of emulsion because of the turbulent commingling of the distillate and inhibitor, and not only would additional equipment be required to break the emulsion thus formed by heating the same, but quantities of the inhibitor would be lost in such equipment by solution in the recovered distillate. Therefore, the stratification and separate withdrawal of the distillate and aqueous phases in the separator 97 not only minimizes the formation of emulsions but also reduces the loss of inhibitor. It is also important that this separation be made at the high pressure of the separator 97 in order that the two phases not be withdrawn in a commingled state through a valve or other outlet means which would cause pressure reduction resulting necessarily in emulsion formation and inhibitor loss.

It may be that some emulsion is created within the choke 95, but since the emulsion, because of its density concentrates at the interface between the distillate layer and the aqueous layer of the separator 97 it may be heated adequately to cause breaking and destruction of the emulsion. By means of the heating coil 96, this interface area may conveniently be held at a temperature of approximately 80° F. and glycol-distillate emulsions readily break at this temperature. The elongate, horizontal structure of the separator 97 causes any emulsion which may be present to be spread out in a thin layer, thus greatly facilitating its heating and breaking, and the long horizontal flow path afforded by the horizontal separator results in an extended retention time in the separator for the emulsion, thus further making certain that no emulsion escapes from the separator. Thus, it is important and advantageous in many cases not only to use an inhibitor in the system, but also to use an inhibitor with a horizontal low temperature separator and to employ this new method wherein the distillate and aqueous layers are stratified and separately withdrawn from the separator with adequate provision for breaking any emulsion which may form.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A well fluid separator including, a vessel, means for maintaining a body of liquid in the lower portion of the vessel, means for supplying heat to the body of liquid, a deflection member in the upper portion of the vessel spaced from the body of liquid, means for supplying heat to at least the lower end of the deflector member, a fluid inlet to the vessel directed toward the deflection member so as to impinge a fluid stream thereon, a pressure-reducing choke connected to the fluid inlet, a conductor supplying a well fluid to the choke, a gas outlet from the vessel, and a liquid outlet from the vessel.

2. A well fluid separator including, an elongate horizontal vessel, means for maintaining a body of liquid in the lower portion of the vessel with an elongate horizontal gas space thereabove, a heating member in the lower portion of the vessel, a centrifugal separator enclosure having an open lower end disposed within the gas space in the upper portion of the vessel, a heating member in contact with the enclosure, a fluid inlet to the enclosure, means for passing a well fluid through the heating members, a conductor supplying a well fluid to the fluid inlet, pressure-reducing means in said conductor; a gas outlet from the vessel, and a liquid outlet from the vessel.

3. A well fluid separator including, an elongate horizontal vessel, means for maintaining a body of liquid in the lower portion of the vessel, with an elongate horizontal gas space thereabove, means for supplying heat to the body of liquid, a deflection member having a fluid outlet space disposed within the gas space of the vessel, a fluid inlet to the vessel directed at the deflection member, a conductor supplying a well fluid to the fluid inlet, pressure-reducing means in the latter conductor, a gas outlet from the vessel, a liquid outlet from the vessel, and a plate forming a settling chamber enclosing the gas outlet and having a portion extending transversely of the vessel parallel to and spaced above the upper surface of the body of liquid, disposed in the gas space and being open to the flow of gas adjacent the deflection member.

4. A well separator as set forth in claim 3, and a plurality of elongate plate-like baffles extending longitudinally of the settling chamber.

5. A well fluid separator including, an elongate horizontal vessel, a heating coil in the lower portion of the vessel, means for maintaining in the vessel a body of liquid substantially covering the heating coil, means for conducting a well fluid through the heating coil, a centrifugal separator drum in the upper portion of the vessel having an open lower end, an insulating housing enclosing the upper portion of said drum and spaced therefrom, a heating coil in contact with the lower end of the drum for heating the same, means for conducting a well fluid through the latter heating coil, a fluid inlet to the separator drum, a pressure-reducing choke connected to the fluid inlet, means for conducting a well fluid to the choke, and gas and liquid outlets from the vessel.

6. The method of separating the components of a well stream including the steps of passing at least the predominantly gaseous portion of the well stream through a pressure reduction step to cool the same, separating gas from the reduced-pressure portion of the well stream, allowing the stream to stratify into gas and liquid layers, allowing the liquids to stratify into water and hydrocarbon layers, drawing off water and hydrocarbons separately, drawing off the separated gas, and recombining the drawn-off gas and hydrocarbons whereby water is effectively removed from the well stream.

7. A well fluid separator including, an elongate horizontal vessel, a heating coil in the lower portion of the vessel, means for maintaining in the vessel a body of liquid having its upper surface spaced from the upper portion of the vessel so as to define an elongate horizontal gas space in the upper portion of the vessel, means for conducting a heating fluid through the heating coil, a fluid inlet to the horizontal gas space in the upper portion of the vessel, a pressure reducing element connected to the fluid inlet, means for conducting a well fluid through the pressure-reducing element to the fluid inlet, a liquid outlet from the vessel, and a gas outlet from the vessel spaced horizontally from the fluid inlet whereby gas entering the fluid inlet is caused to flow through an elongate horizontal path over the body of liquid to the gas outlet and effective rectification of the well fluid components is obtained.

8. A well fluid separator including, an elongate horizontal vessel, a transverse partition in the vessel having its upper margin spaced below the upper portion of the vessel, the partition dividing the lower portion of the vessel into a liquid accumulating space and a liquid outlet space and providing means for maintaining in the liquid accumulating space a body of liquid having its upper surface spaced from the upper portion of the vessel with an elongate horizontal gas space thereabove, heating means in the liquid accumulating space, a fluid inlet to the portion of the vessel containing the liquid accumulating space, pressure-reducing means connected to the fluid inlet, a liquid outlet from the liquid outlet space, and a gas outlet from the gas space, the gas outlet being spaced horizontally from the fluid inlet whereby gas entering the fluid inlet is caused to flow through an elongate horizontal path over the body of liquid to the gas outlet and effective rectification of the well fluid components is obtained.

9. A well fluid separator including, a vessel, means for maintaining a body of water in the lower portion of the vessel at a predetermined water level, means for maintaining a layer of hydrocarbons on the body of water, a heating coil disposed substantially entirely below the predetermined water level, a fluid inlet to the vessel, a pressure-reducing choke connected to the fluid inlet, a conductor supplying a heating fluid to the heating coil, a conductor supplying a well fluid to the choke, a gas outlet from the vessel, and a liquid outlet from the vessel.

10. A well fluid separator including, a vessel, a heating coil in the lower portion of the vessel, a conductor for supplying a heating fluid to the heating coil, a fluid inlet to the vessel, a pressure-reducing choke connected to the fluid inlet, means for conducting a well fluid to the choke, a gas outlet from the vessel, a liquid outlet from the vessel, a transverse partition in the lower portion of the vessel between the heating coil and the liquid outlet, said partition having its upper edge terminating short of the top wall of the vessel so as to maintain a body of liquid covering the heating coil, a second liquid outlet from the vessel, and a second transverse partition in the lower portion of the vessel between the two liquid outlets, said latter partition having its upper edge disposed in a horizontal plane below that of the first partition, the first partition being between the heating coil and the second partition.

11. A well fluid separator including, an elongate horizontal vessel, means for maintaining in the vessel a body of liquid having its upper surface faced from the upper portion of the vessel so as to define an elongate horizontal gas space in the upper portion of the vessel, means for supplying heat to the body of liquid, a fluid inlet to the horizontal gas space in the upper portion of the vessel, a pressure-reducing element connected to the fluid inlet, means for conducting a well fluid through the pressure-reducing element to the fluid inlet, a liquid outlet from the vessel, a gas outlet from the vessel spaced horizontally from the fluid inlet whereby gas entering the fluid inlet is caused to flow through an elongate horizontal path over the body of liquid to the gas outlet and effective rectification of the well fluid components is obtained, the means for maintaining in the vessel a body of liquid including a transverse partition in the vessel between the fluid inlet and the liquid outlet having its upper edge spaced below the upper wall of the vessel, and a trough extending transversely of the lower portion of the vessel between the fluid inlet and the partition, the upper edge of the trough being disposed in a horizontal plane above that of the partition, and a liquid outlet from the trough.

12. A well fluid separator including, an elongate horizontal vessel, means for maintaining in the vessel a body of liquid having its upper surface spaced from the upper portion of the vessel so as to define an elongate horizontal gas space in the upper portion of the vessel, means for supplying heat to the body of liquid, a fluid inlet to the horizontal gas space in the upper portion of the vessel, a pressure-reducing element connected to the fluid inlet, means for conducting a well fluid through the pressure-reducing element to the fluid inlet, a liquid outlet from the vessel, a gas outlet from the vessel spaced horizontally from the fluid inlet whereby gas entering the fluid inlet is caused to flow through an elongate horizontal path over the body of liquid to the gas outlet and effective rectification of the well fluid components is obtained, the means for maintaining in the vessel a body of liquid including an open-top box extending transversely of the vessel and having its bottom closed and spaced from the bottom wall of the vessel, the box being positioned between the fluid inlet and the liquid outlet with its upper edge spaced below the upper wall of the vessel, an outlet from the box, and a partition in the vessel between the box and the liquid outlet with its upper edge below the upper edge of the box.

13. A well fluid separator including, an elongate horizontal vessel, means for maintaining in the vessel a body of liquid having its upper surface spaced from the upper portion of the vessel so as to define an elongate horizontal gas space in the upper portion of the vessel, means for supplying heat to the body of liquid, a fluid inlet to the horizontal gas space in the upper portion of the vessel, a pressure-reducing element connected to the fluid inlet, means for conducting a well fluid through the pressure-reducing element to the fluid inlet, a liquid outlet from the vessel, a gas outlet from the vessel spaced horizontally from the fluid inlet whereby gas entering the fluid inlet is caused to flow through an elongate horizontal path over the body of liquid to the gas outlet and effective rectification of the well fluid components is obtained, and a heat exchanger having flow paths for a warm fluid and a cool fluid, the vessel gas outlet being connected to one flow path, the other flow path being interposed in the means for conducting a well fluid through the pressure-reducing element to the fluid inlet, a by-pass conductor connected around one of the heat exchanger flow paths, and a three-way valve connected to one intersection of the by-pass conductor and the latter flow path.

14. A well fluid separator including, an elongate horizontal vessel, means for maintaining in the vessel a body of liquid having its upper surface spaced from the upper portion of the vessel so as to define an elongate horizontal gas space in the upper portion of the vessel, means for supplying heat to the body of liquid to volatilize lighter hydrocarbons preferentially therefrom, a fluid inlet to the horizontal gas space in the upper portion of the vessel, a pressure reducing element connected to the fluid inlet for cooling the well stream and chilling the gaseous portion thereof, means for conducting a well fluid through the pressure-reducing element to the fluid inlet to cool the well fluid below hydrate formation temperature, a liquid outlet from the vessel, and a gas outlet from the vessel spaced remotely and horizontally from the fluid inlet for flowing cold gas from the fluid inlet to the gas outlet in an elongate horizontal path over the body of liquid and through the gas space to condense preferentially from the gas space into the body of liquid those heavier hydrocarbons volatilized from the body of liquid by the heating thereof, whereby effective rectification of the well fluid components is obtained.

15. A well fluid separator as set forth in claim 14, wherein the means for maintaining in the vessel a body of liquid includes a transverse partition in the vessel between the fluid inlet and the liquid outlet having its upper edge spaced below the upper wall of the vessel.

16. A well fluid separator as set forth in claim 14, and a deflection member in the vessel between the pressure reducing element and the fluid inlet to the horizontal gas space in the upper portion of the vessel for the impingement thereon of a fluid stream flowing from the pressure reducing element to the fluid inlet.

17. The method of separating a high pressure well stream having a high gas-oil ratio, including the steps of, passing at least the predominantly gaseous portion of the well stream through a pressure reduction step to cool the same to a temperature at which gas hydrates occur at the pressure to which said gaseous portion is reduced, introducing the cold stream into a separating zone, establishing in the separating zone an elongate horizontal liquid stratum and an elongate horizontal cold gas stratum overlying the liquid stratum, supplying heat to the liquid stratum to warm the same and preferentially volatilize light hydrocarbons therefrom into the cold gas stratum, flowing the cold gas separated in the separating zone in an elongate horizontal flow path in the cold gas stratum and over the liquid stratum to preferentially condense from the cold gas stratum into the liquid stratum those heavier hydrocarbons volatilized from the liquid stratum by the heating thereof, drawing off cold gas from the gas stratum at a point remote horizontally from the point of introduction of the well stream into the separating zone, and drawing off hydrocarbons and water from the liquid stratum.

18. The method as set forth in claim 17, and flowing longitudinally of the liquid stratum the liquid separated from the cooled well stream.

19. The method of separating a high pressure well stream having a high gas-oil ratio, including the steps of, preliminarily separating the well stream into a predominantly gaseous stream and a predominantly liquid stream, passing at least the predominantly gaseous portion of the well stream through a pressure reduction step to cool the same to a temperature at which gas hydrates occur at the pressure to which said gaseous portion is reduced, introducing the cold stream into a separating zone, establishing in the separating zone an elongate horizontal liquid stratum and an elongate horizontal cold gas stratum overlying the liquid stratum, supplying heat to the liquid stratum to warm the same and preferentially volatilize light hydrocarbons therefrom into the cold gas stratum, flowing the cold gas separated in the separating zone in an elongate horizontal flow path in the cold gas stratum and over the liquid stratum to preferentially condense from the cold gas stratum into the liquid stratum those heavier hydrocarbons volatilized from the liquid stratum by the heating thereof, drawing off cold gas from the gas stratum at a point remote horizontally from the point of introduction of the well stream into the separating zone, returning the predominantly liquid stream to the liquid stratum, and drawing off hydrocarbons and water from the liquid stratum.

References Cited in the file of this patent

UNITED STATES PATENTS

| | | |
|---|---|---|
| Re. 22,226 | Buckley | Dec. 1, 1942 |
| 2,262,744 | Walker | Nov. 11, 1941 |
| 2,278,750 | Walker | Apr. 7, 1942 |
| 2,284,112 | Walker et al. | May 26, 1942 |
| 2,457,959 | Walker | Jan. 4, 1949 |
| 2,528,028 | Barry | Oct. 31, 1950 |
| 2,610,697 | Lovelady et al. | Sept. 16, 1952 |
| 2,617,276 | Gard et al. | Nov. 11, 1952 |
| 2,665,565 | Parks | Jan. 12, 1954 |
| 2,671,322 | Barry | Mar. 9, 1954 |